United States Patent [19]

Saffran

[11] Patent Number: 5,626,402
[45] Date of Patent: May 6, 1997

[54] APPARATUS FOR SIMULTANEOUSLY APPLYING BRAKES OF A TRAILER WHEN BRAKES OF A TOWING VEHICLE ARE APPLIED

[75] Inventor: Gene E. Saffran, Red Deer, Canada

[73] Assignee: Gordon Wilbur Chiles, Red Deer, Canada; a part interest

[21] Appl. No.: 492,697

[22] Filed: Jun. 20, 1995

[30] Foreign Application Priority Data

Jun. 21, 1994 [CA] Canada ................................ 2126433

[51] Int. Cl.$^6$ ................................................. B60T 7/20
[52] U.S. Cl. ........................... 303/7; 188/3 H; 60/538
[58] Field of Search ....................... 303/7, 3, 20, 9.61, 303/12, 18, 19, 15; 188/3 H, 3 R, 345, 346; 60/534, 537, 538, 545

[56] References Cited

U.S. PATENT DOCUMENTS

| | | | |
|---|---|---|---|
| 2,674,349 | 4/1954 | Phillips | 188/34 |
| 4,056,286 | 11/1977 | Burkett | 303/20 |
| 4,066,996 | 1/1978 | Davis | 303/20 X |
| 4,398,771 | 8/1983 | McCurry et al. | 303/15 |
| 4,418,963 | 12/1983 | Sprockhoff | 303/3 |
| 4,671,578 | 6/1987 | Rothen et al. | 303/15 |
| 4,756,390 | 7/1988 | Meadows | 188/3 H |
| 5,031,729 | 7/1991 | Wittkop et al. | 188/3 H |
| 5,503,468 | 4/1996 | Saffran | 303/7 |

FOREIGN PATENT DOCUMENTS 2726514 12/1978 Germany.

*Primary Examiner*—Peter M. Poon
*Attorney, Agent, or Firm*—Anthony R. Lambert

[57] ABSTRACT

An apparatus for simultaneously applying brakes of a trailer when brakes of a towing vehicle are applied is described. The apparatus includes a vacuum pump which communicates with a vacuum booster in a braking system of the trailer thereby providing vacuum pressure to the vacuum booster. A servomotor is linked to an activating arm that moves a plunger that acts through the vacuum booster upon a master brake cylinder of the trailer. Upon activation, the servomotor provides force to move the plunger thereby sending braking fluid from the master cylinder to brakes in the trailer. A pedal position sensor communicates with a brake pedal in the towing vehicle, whereby the brake pedal position of the towing vehicle is sensed. An encoder communicates with the pedal position sensor. The encoder receives data from the pedal position sensor regarding the brake pedal position of the towing vehicle and encodes such data. A decoder communicates with the encoder and the servomotor. The decoder receives an encoded signal from the encoder regarding the brake pedal position of the towing vehicle and sends a decoded signal to the servomotor to move the plunger in the trailer thereby creating a master to slave connection between the brake pedal of the towing vehicle and the plunger acting upon the master braking cylinder of the trailer.

2 Claims, 2 Drawing Sheets

APPARATUS FOR SIMULTANEOUSLY APPLYING BRAKES OF A TRAILER WHEN BRAKES OF A TOWING VEHICLE ARE APPLIED

FIELD OF THE INVENTION

The present invention relates to an apparatus for simultaneously applying brakes of a trailer when brakes of a towing vehicle are applied.

BACKGROUND OF THE INVENTION

Most jurisdictions require a braking system on a trailer that cooperates with a braking system on a towing vehicle. A number of systems have been developed each of which has their advantages and disadvantages in terms of ease of installation and elimination of lag time.

SUMMARY OF THE INVENTION

What is required is a alternative system for simultaneously applying brakes of a trailer when brakes of a towing vehicle are applied.

In accordance with one aspect of the present invention there is provided an apparatus for simultaneously applying brakes of a trailer when brakes of a towing vehicle are applied including a vacuum pump communicating with a vacuum booster in a braking system of the trailer thereby providing vacuum pressure to the vacuum booster. A servomotor is linked to an activating arm that moves a plunger that acts through the vacuum booster upon a master brake cylinder of the trailer. Upon activation, the servomotor provides force to move the plunger thereby sending braking fluid from the master cylinder to brakes in the trailer. A pedal position sensor communicates with a brake pedal in the towing vehicle, whereby the brake pedal position of the towing vehicle is sensed. An encoder communicates with the pedal position sensor. The encoder receives data from the pedal position sensor regarding the brake pedal position of the towing vehicle and encodes such data. A decoder communicates with the encoder and the servomotor. The decoder receives an encoded signal from the encoder regarding the brake pedal position of the towing vehicle and sends a decoded signal to the servomotor to move the plunger in the trailer thereby creating a master to slave connection between the brake pedal of the towing vehicle and the plunger acting upon the master braking cylinder of the trailer.

Although beneficial results may be obtained through the use of the apparatus, as described above, often there will be a difference between the sensitivity of the brakes of the trailer as compared to the brakes of the towing vehicle. Even more beneficial results may, therefore, be obtained when means are provided to adjust the signal received by the encoder from the pedal position sensor. This adjusts the signal sent from the encoder to the decoder regarding the amount of force exerted by the servomotor upon the plunger acting upon the master braking cylinder of the trailer.

Although beneficial results may be obtained through the use of the apparatus, as described above, if the trailer should become detached from the towing vehicle it is desirable that the brakes be applied to immediately stop the trailer. Even more beneficial results may, therefore, be obtained when the plunger has a first portion telescopically received in a second portion with a tightly compressed spring disposed between the first portion and the second portion. A pin extends through aligned apertures in the first portion and the second portion to contain the biasing force of the tightly compressed spring. A dynamite cable is provided having a first end secured to the pin and a second end secured to the towing vehicle. Upon separation of the towing vehicle and the trailer the dynamite cable stays with the towing vehicle pulling the pin out of the aligned apertures thereby permitting the tightly compressed spring to release its biasing force telescopically moving the plunger into the master cylinder sending braking fluid from the master cylinder to the brakes of the trailer.

The apparatus, as described above, can be used on hydraulic or air brake systems of the towing vehicle. It allows simultaneous application of the brakes of the trailer with those of the towing vehicle. It has a secondary capability, if the trailer becomes detached from the towing vehicle, thus causing the trailer's brakes to be applied in full, which will stop the trailer from running uncontrolled after separation. The brakes of the trailer remain locked until manually released.

BRIEF DESCRIPTION OF THE DRAWINGS

These and other features of the invention will become more apparent from the following description in which reference is made to the appended drawings, wherein.

DETAILED DESCRIPTION OF THE PREFERRED EMBODIMENT

The preferred embodiment, an apparatus for simultaneously applying brakes of a trailer when brakes of a towing vehicle are applied will now be described with reference to FIGS. 1 and 2.

Figure 1:
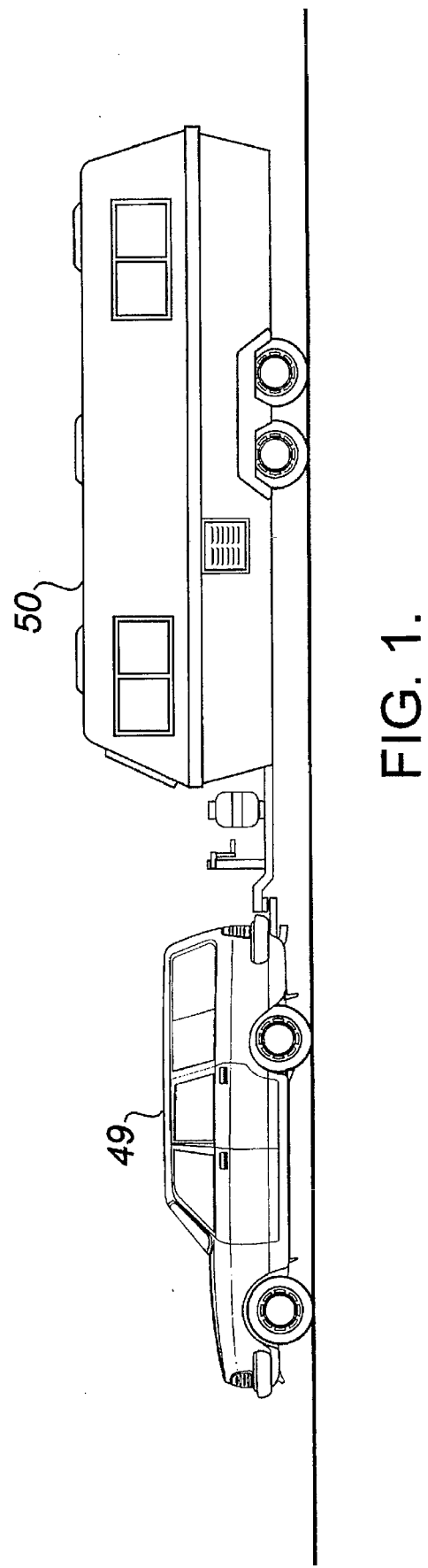
FIG. 1 is a side elevation view of a towing vehicle towing a trailer.
Figure 2:
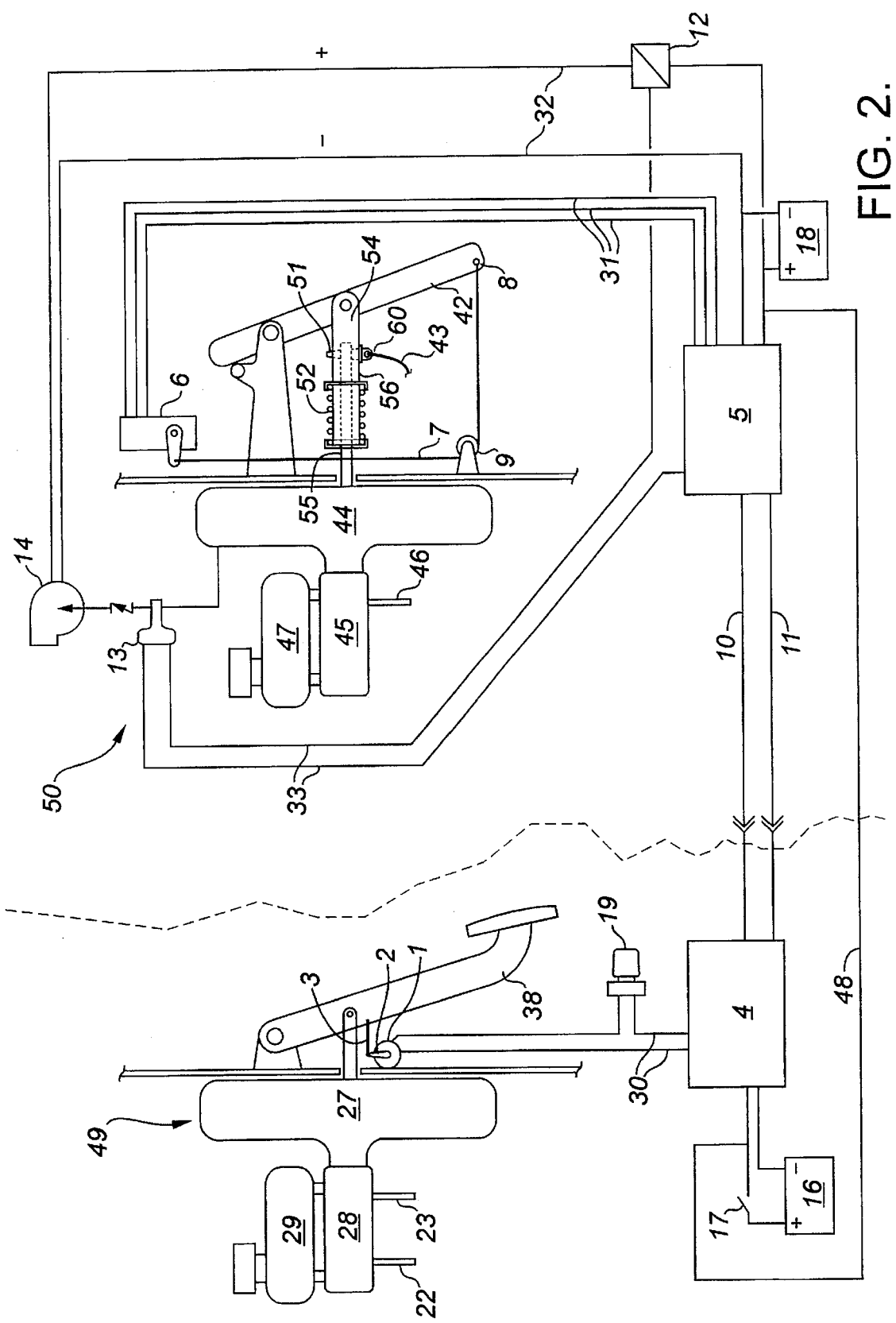
FIG. 2 is schematic representation of an apparatus for simultaneously applying brakes of a trailer when brakes of a towing vehicle are applied.

Referring to FIG. 1, there is illustrated a towing vehicle (49) and a trailer (50). Referring to FIG. 2, a braking system of towing vehicle (49) includes a vacuum booster 27, a master cylinder 28, and a brake fluid reservoir 29. Two brake fluid lines 22 and 23 extend from master cylinder 28 to brakes positioned on the wheels (not shown). Referring to FIG. 2, the system includes a pedal position sensor (1) which is secured under the dash (not shown) and connected by an arm (2) to a rod (3) that is connected to a brake pedal lever (38) of towing vehicle (49). When the brakes (not shown) of towing vehicle (49) are applied, brake pedal lever (38) moves and pedal position sensor (1) sends a signal to an encoder (4). This signal is converted and, in turn, sent to a decoder (5) in trailer (50). Decoder (5), in turn, sends a digital signal through circuit (31) to a servomotor (6). Servomotor (6) is connected to a cable (7) which is routed through pulley (9) and connector (8) to pull arm (42). Pull arm (42) is linked to and acts upon a plunger (54) connected via vacuum booster (44) to act upon a master cylinder (45) to force brake fluid through pressure lines (46) to brakes positioned on wheel cylinders (not shown), thus applying the brakes of trailer (50). Brake fluid is supplied to master cylinder (45) from brake fluid reservoir (47). The signal sent from pedal position sensor (1) through circuit (30) can be modified by potentiometer (19) to increase or decrease braking as per road conditions or trailer weight. There is virtually no lag time between the two brake systems (approx 0.23 sec). Power is supplied to the system by an existing battery (16) in towing vehicle (49) and an auxiliary battery (18) placed in trailer (50).

Plunger (54) has a first portion (55) telescopically received in a second portion (56), with a tightly compressed spring (52) disposed between first portion (55) and second portion (56). A pin (51) extends through aligned apertures (57) in first portion (55) and second portion (56) to contain the biasing force of tightly compressed spring (52). A dynamite cable (43) is provided having a first end (61) secured to pin (51) and a second end (not shown) secured to towing vehicle (49). In the case of separation of trailer (50) from towing vehicle (49), dynamite cable (43) stays with towing vehicle (49) and pulls pin (51) out of apertures (57). Removing pin (51) releases tightly compressed spring (52), causing plunger (54) to telescope into master cylinder (45), sending brake fluid through pressure lines (46) and locking the brakes of trailer (50) in a "full on" position.

The use and operation of the apparatus will now be described with reference to FIGS. 1 and 2. Referring to FIG. 2, when ignition switch (17) is turned on in towing vehicle (49), encoder (4) is activated and, in turn, powers up decoder (5). When the trailer is plugged in, power lead in trailer plug powers up circuit (48) from the towing vehicle (49) ignition system to relay (12) and vacuum switch (13). Contacts on vacuum switch (13) are closed, energizing vacuum pump motor (14) to create a vacuum source for vacuum booster (44). When vacuum reaches 17 hg. vacuum switch (13) opens circuit (32) opening relay (12) shutting down vacuum pump motor (14). When brake pedal (38) in the towing vehicle (49) is depressed moving rod (3) connected to arm (2) to pot (1) a signal is sent through circuit (30) to encoder (4). Encoder (4) sends a converted signal through circuit (10) (11) to decoder (5). Decoder (5) in turn sends a digital signal through circuit (31) to servomotor (6) which moves the cable (7) to pull arm (42). Movement of pull arm (42) causes plunger (54) to exert a force upon master cylinder (45) which results in brake fluid being sent from brake fluid reservoir (47) through pressure lines (46) to wheel cylinders, thus applying the brakes on trailer (50). The signal sent from the pedal position sensor (1) through circuit (30) is modified, as required, through potentiometer (19) to increase or decrease braking as per road conditions or trailer weight. In the case of separation of the trailer (50) from the towing vehicle (49) the dynamite cable (43) will be pulled, removing pin (51) releasing the spring coupler (52) causing first portion (55) of plunger (54) to telescope. The telescopic expansion of plunger (54) exerts a force upon master cylinder (45) locking the brakes on trailer (50). The brakes will remain locked until manually reset.

It will be apparent to one skilled in the art that this new remote, electronically controlled, braking system allows simultaneous activation of the braking system of towing vehicle (49) and the braking system of trailer (50), without altering the original brake systems of either unit. It will also be apparent that this apparatus applies the brakes of trailer (50) without a significant lag time. It will finally be apparent to one skilled in the art that modifications may be made to the illustrated embodiment without departing from the spirit and scope of the invention as hereinafter defined in the claims.

The embodiments of the invention in which an exclusive property or privilege is claimed are defined as follows:

1. An apparatus for simultaneously applying brakes of a trailer when brakes of a towing vehicle are applied, comprising:

a. a vacuum pump communicating with a vacuum booster in a braking system of the trailer thereby providing vacuum pressure to the vacuum booster;

b. a servomotor linked to an activating arm that moves a plunger that acts through the vacuum booster upon a master brake cylinder of the trailer, upon activation, the servomotor provides force to move the plunger thereby sending braking fluid from the master cylinder to brakes in the trailer;

c. a pedal position sensor communicating with a brake pedal in the towing vehicle, whereby the brake pedal position of the towing vehicle is sensed;

d. an encoder communicating with the pedal position sensor, the encoder receiving data from the pedal position sensor regarding the brake pedal position of the towing vehicle and encoding such data;

e. a decoder communicating with the encoder and the servomotor, the decoder receiving an encoded signal from the encoder regarding the brake pedal position of the towing vehicle and sending a decoded signal to the servomotor to move the plunger in the trailer thereby creating a master to slave connection between the brake pedal of the towing vehicle and the plunger acting upon the master braking cylinder of the trailer; and f. the plunger having a first portion telescopically received in a second portion with a tightly compressed spring disposed between the first portion and the second portion, a pin extending through aligned apertures in the first portion and the second portion to contain the biasing force of the tightly compressed spring, a dynamite cable having a first end secured to the pin and a second end secured to the towing vehicle such that upon separation of the towing vehicle and the trailer the dynamite cable stays with the towing vehicle pulling the pin out of the aligned apertures thereby permitting the tightly compressed spring to release its biasing force telescopically moving the plunger into the master cylinder sending braking fluid from the master cylinder to the brakes of the trailer.

2. An apparatus for simultaneously applying brakes of a trailer when brakes of a towing vehicle are applied, comprising:

a. a vacuum pump communicating with a vacuum booster in a braking system of the trailer thereby providing vacuum pressure to the vacuum booster;

b. a servomotor linked to an activating arm that moves a plunger that acts through the vacuum booster upon a master brake cylinder of the trailer, upon activation, the servomotor provides force to move the plunger thereby sending braking fluid from the master cylinder to brakes in the trailer;

c. a pedal position sensor communicating with a brake pedal in the towing vehicle, whereby the brake pedal position of the towing vehicle is sensed;

d. an encoder communicating with the pedal position sensor, the encoder receiving data from the pedal position sensor regarding the brake pedal position of the towing vehicle and encoding such data;

e. a decoder communicating with the encoder and the servomotor, the decoder receiving an encoded signal from the encoder regarding the brake pedal position of the towing vehicle and sending a decoded signal to the servomotor to move the plunger in the trailer thereby creating a master to slave connection between the brake pedal of the towing vehicle and the plunger acting upon the master braking cylinder of the trailer;

f. means to adjust the signal received by the encoder from the pedal position sensor, thereby adjusting the signal sent from the encoder to the decoder regarding the amount of force exerted by the servomotor upon the plunger acting upon the master braking cylinder of the trailer; and g. the plunger having a first portion telescopically received in a second portion with a tightly compressed spring disposed between the first portion and the second portion, a pin extending through aligned apertures in the first portion and the second portion to contain the biasing force of the tightly compressed spring, a dynamite cable having a first end secured to the pin and a second end secured to the towing vehicle such that upon separation of the towing vehicle and the trailer the dynamite cable stays with the towing vehicle pulling the pin out of the aligned apertures thereby permitting the tightly compressed spring to release its biasing force telescopically moving the plunger into the master cylinder sending braking fluid from the master cylinder to the brakes of the trailer.

* * * * *